United States Patent [19]
Siegmund

[11] 3,899,315

[45] Aug. 12, 1975

[54] METHOD OF MAKING GLASS CLAD GLASS LENSES

[75] Inventor: Walter P. Siegmund, Woodstock, Conn.

[73] Assignee: American Optical Corporation, Southbridge, Mass.

[22] Filed: Apr. 15, 1974

[21] Appl. No.: 460,845

[52] U.S. Cl. ............................ 65/23; 65/31; 65/39; 65/100; 65/121; 65/60; 156/99; 156/155
[51] Int. Cl. ...................... C03b 19/00; C03b 11/08
[58] Field of Search .......... 65/23, 31, 121, 177, 60, 65/182 R, 65 R, 121, 39, 100; 156/99, 155

[56] References Cited
UNITED STATES PATENTS

| | | | |
|---|---|---|---|
| 1,975,397 | 10/1934 | Kreidl | 65/60 X |
| 2,305,683 | 12/1942 | Engels | 65/60 X |
| 2,500,105 | 3/1950 | Weber | 65/121 X |
| 2,795,084 | 6/1957 | Littleton | 65/23 X |
| 3,428,475 | 2/1969 | Teeg | 65/60 X |
| 3,746,526 | 7/1973 | Giffon | 65/121 |
| 3,831,466 | 8/1974 | Hicks, Jr. | 65/31 |

*Primary Examiner*—S. Leon Bashore
*Assistant Examiner*—Frank W. Miga
*Attorney, Agent, or Firm*—H. R. Berkenstock, Jr.; William C. Nealon

[57] ABSTRACT

Lenses clad with a relatively thin layer of glass for enhancing their impact resistance and, by choice of the manufacturer, providing a uniform lens coloration from edge to edge in each case independently of respective thicknesses and radii of surface curvatures.

5 Claims, 9 Drawing Figures 3,899,315

METHOD OF MAKING GLASS CLAD GLASS LENSES

BACKGROUND OF THE INVENTION

1. Field of the Invention

This invention relates to improvements in ophthalmic lenses and has particular reference to the manufacture of glass clad glass lenses having a high resistance to impact and an adaptability to coloration in uniform density from edge to edge independently of their center thicknesses and radii of surface curvatures.

2. Description of the Prior Art

Conventional lens molding procedures such as cane molding or hot pressing from gobs of freshly made glass leave the lens surfaces covered with blemishes and "orange-peel" (dimpling). While such lenses may be adequate for use as light transmitting condenser lenses, they are not of ophthalmic or image transmitting objective lens quality. The degree of surface smoothness required or ophthalmic and other image conducting lenses is not obtainable with pressing tools which make direct contact with lens surfaces. Occurrences of dust or other particulate matter, scratches, ridges and other such imperfections on pressing tools produce correspondingly shaped dimples, ridges and grooves respectively in surfaces of the pressed lenses.

Accordingly, in the manufacture of ophthalmic lenses, it has been the practice heretofore to grind and polish pressed lenses to obtain surface finishes of ophthalmic quality. This is a tedious, time consuming and expensive procedure which weakens the impact resistance of the lenses. It creates microscopic and submicroscopic fractures or similar flaws that cannot be completely removed by polishing. Thus, added to the aforementioned drawbacks of tediousness and costliness of grinding and polishing is the need for further treatment of ophthalmic lenses to restore and/or enhance their impact resistance at least to the extent of meeting the minimum standards of impact resistance which are required of such lenses. Heretofore, this involved separately heat treating or chemically treating each lens to produce a compressive surface effect placing inner portions of the lens under tension.

The present invention overcomes the aforementioned drawbacks of producing ophthalmic lenses by conventional surface grinding, polishing and separate chemical or heat treatment with a greatly simplified, highly economical lens manufacturing method which not only eliminates grinding and polishing operations but automatically enhances impact resistance.

Additionally, the present invention offers the manufacturer the option of producing lenses having a uniform density of coloration from edge to edge. Heretofore, the main body glasses of lenses have been pigmented and variations in lens thicknesses from center to edge have caused corresponding variations (lightening or darkening) of coloration.

SUMMARY OF THE INVENTION

The aforementioned objectives of the invention are accomplished through the provision of a novel glass clad glass lens and method of making the same. A preform of the lens is made up of a central major piece of glass which is to become the main body of the lens, a relatively thin cladding of glass which is preselected to have a substantially lower coefficient of expansion than that of said major piece for purposes of placing the major piece under tension and rendering the combination highly resistant to impact, and an outer relatively thin layer of a removable (chemically leachable) glass for protecting the underlying glasses against blemishing during the operations of preparing and shaping the preform to the final configuration desired of the lens.

The preform, being initially of a length, width and thickness equal to or greater than the corresponding dimensions desired of the finished lens, is shaped by slumping and/or pressing in a heat softened state to the final shape desired of the lens to be produced therefrom.

At one stage of the aforesaid process, preferably during the fabrication of the preform, its inner and outer claddings are caused to become interfacially fused respectively to the major piece of glass and to each other. During such fusion or subsequent thereto, precision flattening of these interfaces of the preform may be effected by rolling or "floating" of the preform to enhance the production of a finish of ophthalmic quality upon the first cladding.

A colorant may be added to the material of the first cladding of the preform for coloring the finished lens. The cladding being of a uniform thickness distributes the coloration uniformly across the lens.

The invention will be more fully understood by reference to the following detailed description when taken in conjunction with the accompanying drawings.

IN THE DRAWINGS

DESCRIPTION OF THE PREFERRED EMBODIMENTS

Figure 7:
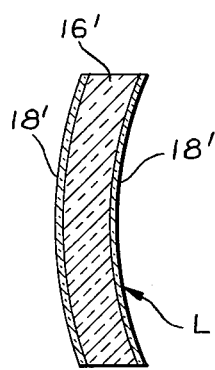
FIGS. 7, 8 and 9 are cross-sectional views of exemplary types of finished lenses which may be produced according to the invention.
Figure 8:
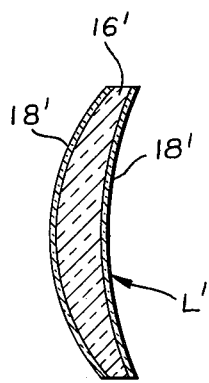
Figure 9:
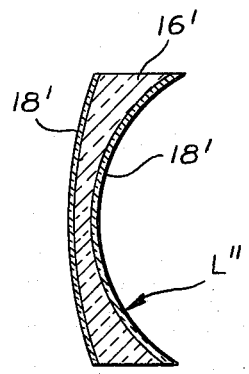

The following description will be directed more particularly to improvements in finished ophthalmic lenses, e.g. of types illustrated in FIGS. 7, 8 and 9 and method of making the same. It is to be understood, however, that while these lenses are referred to as being "finished" they may be additionally peripherally cut and/or ground (edged) to particular configurations conforming to the shapes of lens mounting rims of spectacle frames to which they may be applied in the usual manner of preparing ophthalmic lenses for patient use. The operations of peripherally edging and mounting these or other ophthalmic lenses form no part of the present invention and, accordingly, will not be further dealt with herein.

The expression "finished" and other expressions such as "ophthalmic finish" and "ophthalmic quality" which are used in this disclosure are to be interpreted as being descriptive of lens surfaces of exceptional smoothness, i.e. the degree of smoothness having long been established in the art as being that necessary for producing optimum visual acuity when used in conjunction with the eyes. This terminology is intended to refer to a surface texture or smoothness meeting or bettering present day standards expected of high quality ophthalmic lenses. Such surfaces are of bright finish and substantially if not completely free of pits, stains, scratches, dimples ("orange-peel" defects) or other discontinuities and waviness.

Figure 1:
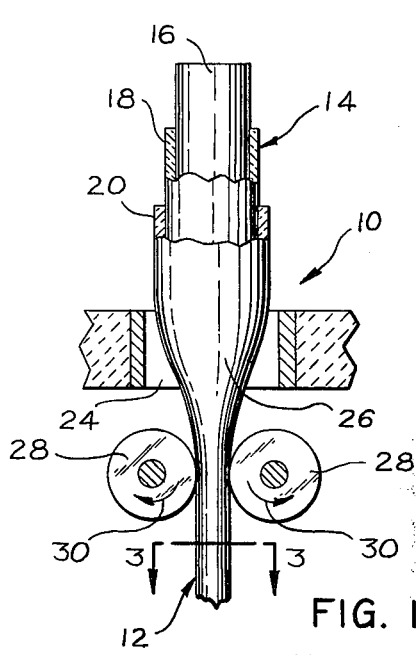
FIG. 1 and 2 are diagrammatic illustrations of exemplary apparatuses and techniques for fabricating glass preforms from which lenses may be produced according to the invention.

Operations contemplated for producing lenses of the types depicted in FIGS. 7, 8 and 9 are illustrated in FIGS. 1–6. FIG. 1, in particular, illustrates a system 10 for producing a basic glass structure or preform 12 from which the finished lenses may be formed.

The system of FIG. 1 includes the assembly 14 of a rod of glass 16 disposed internally of a glass tube 18 which, in turn, is disposed within a sleeve 20 of glass. The assembly 14 is heated zonally progressively along its length to a temperature causing fusion of its components 16, 18 and 20 and permitting the assembly 14 to be drawn longitudinally to a reduced cross-sectional size. Annular heating element 22 produces a zone 24 of heat into which assembly 14 is gradually lowered and necked down at section 26 by drawing rollers 28. It is to be understood that heating element 22 may comprise any one of the various types of zone heating devices commonly used in the art of working glass articles, i.e. it may be electrically operated or in the form of an annular array of flame producing gas jets.

Referring more particularly to details of the assembly 14 (FIG. 1), rod 16 which may be circular, oval or rectangularly shaped is formed of a glass of the type (e.g. ophthalmic crown) desired of the main body glass of clad lenses to be produced according to the invention. Tube 18, which may alternatively be in the form of contiguous slabs of glass, is comprised of a glass having approximately the same refractive index as that of rod 16 but an appreciably lower coefficient of expansion, this glass ultimately becoming the cladding of the finished lens wherewith the lens main body glass is placed in tension and the lens is rendered highly resistant to impact. The glass of sleeve 20, which is provided for purposes of protecting its underlying glasses against blemishing during the lens forming process of the invention, is preferably of a chemically soluble (leachable) type having a coefficient of expansion which is compatible for smooth and substantially strain free fusion to the cladding glass of tube 18.

Rod 16, tube 18 and sleeve 20 of assembly 14 are all fused together and necked down at section 26 in heating zone 24 and the fused unit is flattened by rollers 28 to the thickness and width desired of preform 12 from which finished glass clad lenses, e.g. of types shown in FIG. 7, 8 and 9, are produced. It should be understood, however, that additional sets of rollers similar to rollers 28 and/or additional amounts of heat applied either to the rollers or directly to preform 12 may be incorporated in the system of FIG. 1 to facilitate a desired flattening or other shaping of preform 12.

Figure 3:
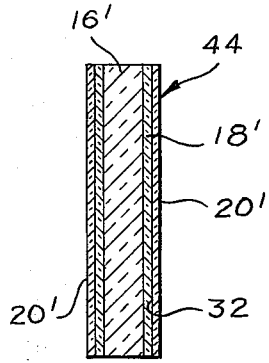
FIG. 3 is a view taken generally along line 3—3 of FIG. 1 illustrating cross-sectional details of a lens preform produced according to the technique illustrated in FIG. 1.
Figure 4:
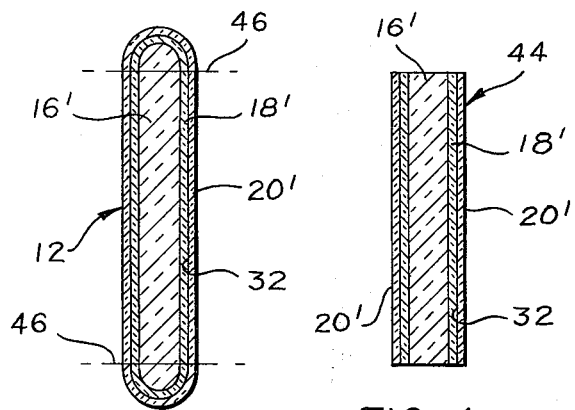
FIG. 4 is an illustration in cross section of a portion of the preform shown in FIG. 3.

Preform 12, as best illustrated in FIG. 3, comprises main body glass 16', cladding glass 18' and a protective sheathing glass 20'. These fused glasses of preform 12 may, after leaving rollers 28, be directed onto and floated horizontally over a bath of molten metal, e.g. tin, for precision flattening of their fused interfaces. Molten metal float baths and apparatuses involved in such techniques of flattening glasses have not been shown herein. Those interested in details of "float glass" procedures may refer to one or more of U.S. Pat. Nos. 3,220,816; 3,356,478; or 3,413,107.

Figure 2:
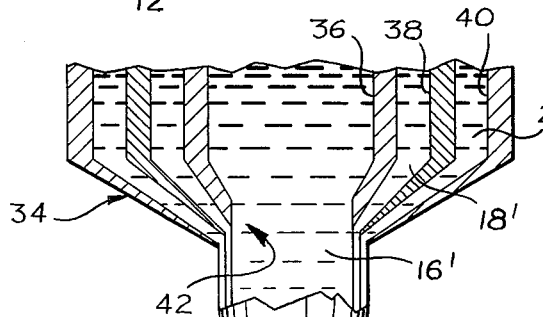

An alternative to the use of the rod, tube and sleeve assembly 14 of FIG. 1 in the fabrication of preform 12 is illustrated in FIG. 2. In FIG. 2, a tank 34 having three compartments 36, 38 and 40 containing molten supplies of the main body glass 16', cladding glass 18' and protective sheathing glass 20' is provided with a triple extrusion orifice 42 through which these molten glasses are extruded and shaped by rollers 28' into a preform 12' of the type illustrated in FIG. 3 as preform 12. As in the case of forming preform 12 according to the system shown in FIG. 1, preform 12' resulting from the system of FIG. 2 may be precision flattened by additional rollers and/or floating over molten metal.

Referring more particularly to preform 12 of FIG. 3, whether formed by the system of FIG. 1 or FIG. 2 or otherwise, a lens blank 44 (FIG. 4) is cut from preform 12. This may be accomplished by punching, sawing, trepanning or otherwise cutting through preform 12 along lines 46. In the case of trepanning, sawing or similarly cutting a blank 44 from preform 12, the preform would preferably be cooled or maintained in a relatively rigid state. In the case of punching, the preform would preferably be maintained in a relatively soft state or preheated to permit such an operation to be performed thereupon.

Completion of a lens according to the invention next involves shaping blank 44 to the configuration, usually meniscus, desired of the lens. This may be accomplished by causing blank 44 to slump, when properly heat-softened, over a forming mold to the shape desired of the finished lens and/or pressing the heat softened blank 44 to the desired final shape.

Figure 5:
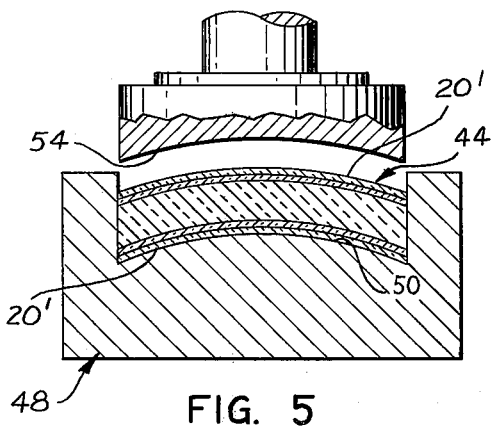
FIGS. 5 and 6 are diagrammatic illustrations of apparatuses and techniques which may be used in the working of the preform of FIG. 4 to produce a finished lens according to the invention.

In FIG. 5 there is illustrated a shaping mold 48 having shaping surface 50 of the curvature or configuration desired of one side of the finished lens and against which blank 44 may be placed and caused to conform in shape either by slumping thereagainst with the application of heat and/or pressure applied with a plunger 52 forced downwardly into mold 48. In the latter case, forming surface 54 of plunger 52 is shaped according to the surface configuration desired of the convex side of a finished lens formed of blank 44.

Referring more particularly to FIGS. 7, 8 and 9, it can be seen that three basic types of finished lenses are illustrated. In FIG. 7, the finished lens L is, while being meniscusly shaped, of uniform thickness from edge-to-edge and has substantially no refractive power. Lens L' (FIG. 8) is typically a lens of the type having positive refractive power, i.e commonly referred to as a pulse power lens and lens L'' of FIG. 9 has a negative refractive power, i.e. it is a minus power lens.

The shaping of blanks 44 (FIG. 5) to the final configuration of any one of the various basic types of lenses illustrated in FIGS. 7–9 and more particularly to specific radii of convex and concave surface curvatures may be accomplished by proper selection of the curvatures of surfaces 50 and/or 54 of mold 48 and plunger 52 respectively. Mold 48 and plunger 52 may be constructed of cast iron, high temperature steel or nonmetallic ceramic or silicon carbide refractories and the like.

Having formed lens blank 44 to the particular shape desired, e.g. similar to one of the shapes of lenses L, L' or L'', its outer sheathing of protective glass 20' is removed to expose the underlying surfaces of cladding 18'. These surfaces having a finish of ophthalmic quality become without further working the finished exterior surfaces of the glass clad ophthalmic lens.

Figure 6:
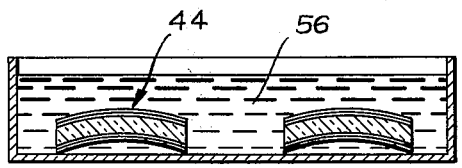

Removal of the protective sheathing glass 20' may be accomplished as illustrated in FIG. 6 by immersion of the lens blank 44 in a suitable leaching medium 56, e.g. a solution of hydrochloric acid.

From the foregoing description, it can be seen that during the entire processing of preform 12 (FIGS. 1–5), the surfaces of glass 18' at interface 32 are completely protected by glass 20' and thus maintained free of such defects as scratching, dimpling (orange-peel) and particulate matter inclusions which ordinarily cause indentation and similar imperfections. For example, occurrences of dust or other particulate matter, scratches or ridges on surfaces 50 and 54 of mold 48 and plunger 52 would ordinarily produce correspondingly shaped dimples, ridges and grooves respectively in surfaces of lens blanks formed without the protective sheathing glass 20'. With this protective sheathing glass, such surface defects are prevented from reaching interface 32 thereby protecting the surface of glass 20' at interface 32 against blemishing.

Thus, upon completion of a lens by removal of its outer protective sheating glass 20' (e.g. as illustrated in FIG. 6) the exposed surfaces of glasses 20' (FIGS. 7, 8 or 9) have finishes of ophthalmic quality requiring no further working.

Additionally, and especially pertinent to the present invention, is the fact that cladding glasses 18' of lenses L, L' or L'' place the main body glasses 16' of these lenses in tension rendering the finished lenses highly resistant to damage by impact.

In addition to a lens being rendered highly resistant to impact as a result of the aforementioned differences in coefficients of expansion of its main body and cladding glasses 16' and 18' respectively, conventional glass colorants such as oxides of iron, copper, neodymium and/or other metals may be added to batch compositions of cladding glass 18' for coloring the lenses. Thus, regardless of center thicknesses and surface curvature configurations of the lenses produced according to the invention, the colorant becomes distributed uniformly from edge-to-edge across the lenses as a result of the lens cladding glass 18' being of uniform thickness throughout its extension over the main body glass 16' in each case.

Glasses which are useful in the practice of the present invention are manufactured and sold by Schott Optical Glass, Inc; York Avenue, Duryea, Pa.

Examples of these glasses are:

For main body glass 16':

1. Optical Crown K3-518590 having a refractive index of approximately 1.518, a coefficient of linear thermal expansion of approximately $98 \times 10^{-7}/°C$ ($+20°$ to $+300°C$); and transformation temperature of approximately 521°C.

2. Optical Crown K5-522595 having an index of refraction of approximately 1.522, and a coefficient of linear thermal expansion of approximately $96 \times 10^{-7}/°C$ ($+20°$ to $+300°C$) and a transformation temperature of approximately 543°C.

For cladding glass 18':

1. Borosilicate Crown BK3-498651 having an index of refraction of approximately 1.498, a coefficient of linear thermal expansion of approximately $61 \times 10^{-7}/°C$ ($+20°C$ to $+300°C$) and a transformation temperature of approximately 553°C.

2. Borosilicate Crown BK10-498670 having an index of refraction of approximately 1.497, a coefficient of linear thermal expansion of approximately $66 \times 10^{-7}/°C$ ($+20°C$ to $+300°C$) and a transformation temperature of approximately 532°C.

For the removable protective sheathing glass 20':

A lanthinum borosilicate glass of the following composition in weight percent:

|  | Approximate weight % |
|---|---|
| $SiO_2$ | 12.7 |
| $B_2O_3$ | 17.2 |
| BaO | 46 |
| $Al_2O_3$ | 2 |
| $La_2O_3$ | 12 |
| $ThO_2$ | 9.6 |
| $As_2O_3$ | .5 |

Other chemically soluble (leachable) glasses useful as a sheathing glass 20' are referred to in U.S. Pat. Nos. 3,004,368 and 3,624,816.

The leaching medium 56 (FIG. 6) may comprise a solution from 5 to 10% (by volume) hydrochloric acid preferably maintained at a temperature of approximately 65°C. Higher or lower temperatures and/or concentrations of acid may be used, if desired.

As described hereinabove, the protective glass 20' prevents blemishing of the surface of cladding glass 18' during the manufacture of a lens according to this invention and, when removed from the lens, the underlying protected surface may be used ophthalmically without the need for further processing by grinding and/or polishing.

It should be understood, however, that removal of the protective glass 20' in any one or more instances of forming any one or more of the types of lenses illustrated in FIGS. 7 8 and 9 may be postponed until all work has been completed upon the lenses. In other words, the final edge cutting or grinding of the lenses to shapes and sizes required for mounting in spectacle frames may be completed prior to the removal of glass 20'.

Thicknesses of finished lenses of the types illustrated in FIGS. 7, 8 and 9 would typically average several millimeters, including a fraction of a millimeter of cladding glass 18' at each side of the lens. The additional protective glass 20' (FIGS. 3, 4 and 5) need not be more than a fraction of a millimeter in thickness at any one point. It is to be understood, however, that these dimensions are given only for purposes of illustration and may, in certain applications of the present invention, each vary by substantial amounts either increasingly or decreasingly.

Temperatures used in the various workings of the abovementioned exemplary glasses according to the invention, e.g. floating, drawing, fusing one to another, slumping and/or pressing to meniscus shapes have not been discussed in detail hereinabove since it is well within the skill of an artisan to determine appropriate temperatures for the performance of these operations from knowledge of transformation temperatures of the specific glasses selected for use. However, for those glasses mentioned hereinabove, a suitable range of working temperatures would normally extend from approximately 1050°C to 1350°C. Extruding and floating of these glasses would ordinarily require use of higher temperatures of the aforesaid range. Drawing and shaping (pressing) operations, however, may be performed with the glasses at lower temperatures of the exemplary range.

From the foregoing description, it can be seen that the present invention has uniquely obviated surface grinding and polishing operations in the manufacture of ophthalmic lenses and further, obviated the need for separate glass toughening operations. The invention produces lenses of high impact resistance with an adaptability for uniform coloration from edge-to-edge.

I claim:

1. The method of making a glass clad ophthalmic lens comprising the steps of:

forming a first thick layer of glass of the type desired of the major portion of said lens, said glass having a predetermined index of refraction and coefficient of expansion and said layer being of at least the length, width and thickness desired of said lens;

covering at least on side of said first layer of glass with a second relatively thin layer of a second glass having an appreciably lower coefficient of expansion than that of said first layer glass;

covering said second layer of glass with a third layer of a removable protective glass;

fusing with the application of heat said first, second and third layers of glass interfacially to one another at one stage of the formation of the combination thereof, said heat placing said first layer of glass in tension and said second layer glass of lower coefficient of expansion in compression, the fused combination comprising a preform of said lens;

flattening said preform to a degree of precision producing a finish of ophthalmic quality upon said second layer of glass adjacent said third layer;

shaping at least a portion of said preform to at least approximately the shape desired of said lens; and removing said third layer of protective glass from said shaped portion of said preform to expose the underlying surface of said second layer of glass, said underlying surface thus constituting a finished surface of said lens with said second layer of glass being in compression and said first layer of glass under tension whereby said resulting lens is rendered highly resistant to damage by impact.

2. The method of making a glass clad ophthalmic lens according to claim 1 wherein said fused combination of said first, second and third layers of glasses is formed by constructing an assembly of such glasses in a rigid state, the assembly being of an appreciably greater dimension in cross-section than that desired of said preform of said lens but with respective component glasses each occupying an area of said cross-section which is substantially proportional to the corresponding thickness desired thereof in said perform, said assembly being heat softened, drawn and shaped to the configuration desired of said preform.

3. The method of making a glass clad ophthalmic lens according to claim 1 wherein said fused combination of said first, second and third layers of glasses if formed by extruding such glasses simultaneously with said third glass surrounding said second glass and said first glass being centrally disposed in a resulting extruded assembly, the respective component glasses of said extruded assembly each occupying an area of its cross section which is substantially proportional to the corresponding thicknesses desired thereof in said preform, said extruded assembly being subsequently shaped to the configuration desired of said preform.

4. The method of making a glass clad ophthalmic lens according to claim 1 wherein said step of shaping at least a portion of said preform includes an operation of cupping the flattened preform to a meniscus configuration.

5. The method of making a glass clad ophthalmic lens according to claim 4 wherein said operation of flattening said preform includes a step of rolling the same to a predetermined thickness and said operation of cupping said preform includes a step of pressing said flattened preform into said meniscus configuration.

* * * * *